United States Patent
Oude Grotebevelsborg

(10) Patent No.: US 11,180,391 B2
(45) Date of Patent: *Nov. 23, 2021

(54) METHOD AND DEVICE FOR PROCESSING SOLID WASTE

(71) Applicant: ANAERGIA B.V., Oldenzaal (NL)

(72) Inventor: Willem Jan Oude Grotebevelsborg, Oldenzaal (NL)

(73) Assignee: ANAERGIA B.V., Oldenzaal (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/085,412

(22) Filed: Mar. 30, 2016

(65) Prior Publication Data

US 2016/0207806 A1    Jul. 21, 2016

Related U.S. Application Data

(63) Continuation-in-part of application No. PCT/NL2014/000030, filed on Sep. 15, 2014, and a
(Continued)

(30) Foreign Application Priority Data

Oct. 2, 2013   (NL) .................................... 1040425

(51) Int. Cl.
*C02F 3/00* (2006.01)
*C02F 11/00* (2006.01)
(Continued)

(52) U.S. Cl.
CPC ................ *C02F 3/28* (2013.01); *C02F 11/04* (2013.01); *C02F 11/125* (2013.01); *C02F 11/127* (2013.01)

(58) Field of Classification Search
CPC .............................. C12M 27/02; C12M 21/04
See application file for complete search history.

(56) References Cited

U.S. PATENT DOCUMENTS

| 2,793,847 A | 5/1957 | Steele |
| 2,954,173 A | 9/1960 | Dunwody |
(Continued)

FOREIGN PATENT DOCUMENTS

| CA | 1117851 A | 2/1982 |
| CH | 620859 A5 | 12/1980 |
(Continued)

OTHER PUBLICATIONS

Chinese Patent Application No. 201480062244.0, Office Action dated Nov. 3, 2017—English Translation Available.
(Continued)

*Primary Examiner* — Nathan A Bowers
(74) *Attorney, Agent, or Firm* — Greer, Burns & Crain, Ltd.

(57) ABSTRACT

Organic waste is polished to remove floatable contaminants prior to being biologically treated. In one application, pressed organic waste is polished before being sent to a wet anaerobic digester, optionally to be co-digested with wastewater treatment plant sludge. The organic waste is polished by flinging globs of the organic waste against a screen while flowing air across the flinging globs. The polishing can be performed in a device having a rotor with discrete paddles inside of a cylindrical screen.

9 Claims, 4 Drawing Sheets

Related U.S. Application Data continuation of application No. PCT/EP2016/053053, filed on Feb. 12, 2016.

(60) Provisional application No. 62/249,892, filed on Nov. 2, 2015.

(51) Int. Cl.
| | | |
|---|---|---|
| C02F 3/28 | (2006.01) | |
| C02F 11/04 | (2006.01) | |
| C02F 11/127 | (2019.01) | |
| C02F 11/125 | (2019.01) | |

(56) References Cited

U.S. PATENT DOCUMENTS

| | | | |
|---|---|---|---|
| 4,106,705 A | 8/1978 | Nakamura | |
| 4,245,999 A | 1/1981 | Reiniger | |
| 4,287,058 A | 9/1981 | Larsen | |
| 5,146,848 A | 9/1992 | Dufour | |
| 5,297,741 A | 3/1994 | Zurn et al. | |
| 5,593,042 A | 1/1997 | Keller | |
| 5,758,778 A | 6/1998 | Kershner | |
| 5,782,950 A | 7/1998 | Kanitz et al. | |
| 5,890,664 A * | 4/1999 | Conant, III | C05F 17/0072 241/101.76 |
| 6,110,727 A * | 8/2000 | Widmer | B01F 3/06 210/603 |
| 6,241,901 B1 | 6/2001 | Leung | |
| 6,270,025 B1 | 8/2001 | Geigle et al. | |
| 6,629,653 B2 | 10/2003 | Fahrbach et al. | |
| 7,097,044 B2 | 8/2006 | Gutierrez et al. | |
| 8,220,728 B2 | 7/2012 | Eriksen | |
| 9,527,091 B2 | 12/2016 | Corcoran et al. | |
| 9,551,108 B2 | 1/2017 | Feng et al. | |
| 9,708,559 B2 | 7/2017 | Gibis et al. | |
| 9,943,986 B2 | 4/2018 | Hayashi et al. | |
| 10,160,011 B2 | 12/2018 | Oude et al. | |
| 2008/0035561 A1 * | 2/2008 | Gray (Gabb) | B09B 3/00 210/603 |
| 2012/0010063 A1 | 1/2012 | Levitt et al. | |
| 2012/0190102 A1 | 7/2012 | Gitschel et al. | |
| 2013/0036625 A1 | 2/2013 | Muerg | |
| 2013/0316428 A1 | 11/2013 | Gonella | |
| 2014/0203120 A1 * | 7/2014 | Gibis | C10L 5/46 241/21 |
| 2015/0076059 A1 * | 3/2015 | Theodoulou | C02F 11/125 210/608 |
| 2015/0314486 A1 | 11/2015 | Hayashi et al. | |
| 2015/0343357 A1 * | 12/2015 | Olsson | B01J 19/1806 422/187 |
| 2016/0339478 A1 | 11/2016 | Tsai | |

FOREIGN PATENT DOCUMENTS

| | | |
|---|---|---|
| CN | 2072442 U | 3/1991 |
| CN | 1105502 A | 7/1995 |
| CN | 1121343 A | 4/1996 |
| CN | 1280887 A | 1/2001 |
| CN | 201135965 Y | 10/2008 |
| CN | 101925418 A | 12/2010 |
| CN | 102374761 A | 3/2012 |
| CN | 102731179 A | 10/2012 |
| CN | 103421847 A | 12/2013 |
| DE | 8103406 U1 | 4/1981 |
| DE | 19616623 B4 | 12/2004 |
| EP | 0359250 A2 | 3/1990 |
| EP | 1207040 A2 | 5/2002 |
| EP | 1215187 A2 | 6/2002 |
| EP | 1007228 B1 | 9/2003 |
| EP | 1568478 A1 | 8/2005 |
| EP | 2006034 A2 | 12/2008 |
| GB | 2276339 A | 9/1994 |
| IT | TO20111068 A1 | 5/2013 |
| JP | 3666800 B2 | 6/2005 |
| WO | 2009011906 A1 | 1/2009 |
| WO | 2015050433 A1 | 4/2015 |
| WO | 2015053617 A1 | 4/2015 |

OTHER PUBLICATIONS

Chinese Patent Application No. CN201480062244.0, Office Action dated Apr. 5, 2017.
English Translation of CH620859A5 (INV: Nakamura, Kensaku; Pub. Date: Dec. 1980).
International Patent Application No. PCT/EP2016/053053, International Search Report and Written Opinion dated Jun. 29, 2016.
International Patent Application No. PCT/NL2014/000030, International Preliminary Report on Patentability dated Apr. 14, 2016.
International Patent Application No. PCT/NL2014/000030, International Search Report and Written Opinion dated Jan. 15, 2015.
U.S. Appl. No. 15/026,355, Non-Final Office Action dated May 30, 2017.
Chinese Patent Application No. 201480062244.0, Office Action dated May 22, 2018—With English Translation.
U.S. Appl. No. 15/026,355, Notice of Allowance dated Apr. 19, 2018.
U.S. Appl. No. 15/026,355, Notice of Allowance dated Aug. 15, 2018.
U.S. Appl. No. 15/026,355, Notice of Allowance dated Dec. 1, 2017.
Italian Patent Application No. ITTO20111068, Search Report dated Apr. 26, 2012.
U.S. Appl. No. 15/767,873, Office Action dated May 16, 2019.
U.S. Appl. No. 15/767,873, Non-Final Office Action dated Jul. 29, 2019.
Chinese Patent Application No. CN201480062244, Office Action dated Mar. 25, 2020—English Translation Available.
U.S. Appl. No. 15/767,873, Non-Final Office Action dated Apr. 22, 2020.
U.S. Appl. No. 15/767,873, Final Office Action dated Dec. 2, 2019.
U.S. Appl. No. 16/191,834, Non-Final Office Action dated Jan. 31, 2020.
Chinese Patent Application No. 201680063110 X, Office Action dated May 25, 2020.
U.S. Appl. No. 16/191,834, Notice of Allowance dated Jun. 19, 2020.

* cited by examiner

METHOD AND DEVICE FOR PROCESSING SOLID WASTE

RELATED APPLICATIONS

This application is a continuation-in-part of PCT Application Serial No. PCT/NL2014/000030, filed Sep. 15, 2014, which claims priority to Dutch Application No. NL 1040425 filed Oct. 2, 2013; a continuation of PCT Application Serial No. PCT/EP2016/053053, filed Feb. 12, 2016; and claims the benefit of U.S. Application Ser. No. 62/249,892, filed Nov. 2, 2015. Application Serial Nos. PCT/NL2014/000030; NL 1040425; PCT/EP2016/053053; and 62/249,892 are incorporated herein by reference.

FIELD

This specification relates to processing solid waste and includes a method and device for separating contaminants, such as pieces of plastic film, from an organic fraction of solid waste.

BACKGROUND

Solid waste can be divided into various fractions distinguished, among other things, by how easily they can be biodegraded. The organic fraction is the part of the waste that is most easily biodegraded and may also be referred to as organic waste. The organic fraction is primarily made up of food waste, but may also include leaf and yard waste or other materials. The organic fraction is approximately 40% of ordinary municipal solid waste (MSW) after recyclables are removed. In communities where the residents separate out food waste from other waste, a source separated organics (SSO) stream is generated that may have an organic fraction of 80% or more. Waste from industrial, commercial and institutional (ICI) sources can have varying amounts of organic material. At least some ICI waste sources, such as food processing companies, restaurants and supermarkets, generate waste with a large organic fraction similar to SSO.

Historically, organic waste was landfilled with other solid waste. However, the organic fraction of solid waste is the major cause of greenhouse gas emissions, leachate and odors in landfills. There is a general trend to divert organic waste for biological treatment, for example by anaerobic digestion (AD) or composting. Most biological treatment steps require some preprocessing of the waste such as debagging and sorting to remove large items such as bottles and cans. Certain biological treatments, such as some composting methods and high-solids slurry and wet (low solids) anaerobic digestion, also require that the waste be reduced in size and homogenized. The size reduction is typically done in a device that comminutes the waste, such as a hammer mill, shredder or pulper. In some cases, the comminuting device also provides a coarse separation of contaminants (i.e. material that is not readily biodegraded, such as plastic). Alternatively, a separate separation device may be added.

Wet anaerobic digestion is typically performed in one or more mixed tanks. These systems are entirely contained and so allow for high levels of odor control and biogas recovery. In many cases, the organic waste can also be co-digested with wastewater treatment plant (WWTP) sludge by modifying existing WWTP digesters rather than building new facilities. However, wet anaerobic digesters are very sensitive to contaminants left in the organic fraction. The contaminants can be subdivided into floatables and settleables. The floatables include items like plastic films or foils (i.e. pieces of shredded plastic bags) that tend to be entrained in circulating digestate or accumulate at the top of a wet digester tank. The settleables include items such as glass or sand than tend to accumulate at the bottom of a wet digester tank. Using conventional waste processing technology, wet anaerobic digestion is essentially limited to treating SSO or other very high quality organic waste streams. Even with these sources and some contaminant separation, a side-stream loop with may be required to continuously remove contaminants from the digester to allow the digester to operate. The digestate also still contains some floatables and typically requires screening before it can be used, for example as fertilizer or a composting additive.

US Publication 2013/0316428 describes an alternative process in which an organic fraction containing biological cells is separated from solid waste in a press. The organic fraction is extruded through a grid having small-bore holes, under a pressure higher than the burst pressure of the cell membranes. The cells are disrupted and a gel or paste of a doughy consistency is produced. The gel can be digested in an anaerobic digester. The press may be as described in European Publication Nos. 1207040 and 1568478 and Italian patent publication ITTO20111068. In general, these presses use a plunger to compress waste that has been loaded into a cylinder. The sides of the cylinder are perforated with radial holes. US Publication 2013/0316428, European Publication Nos. 1207040 and 1568478 and Italian patent publication ITTO20111068 are incorporated herein by reference. One advantage of a press over a comminuting device is that even low quality solid waste (such as MSW) when processed in a press produces an organic fraction with fewer contaminants, for example floatables at 2 wt % or less on a wet basis.

INTRODUCTION TO THE INVENTION

This specification describes a device and process for processing an organic fraction of solid waste. The feed material may be derived from, for example, municipal solid waste (MSW), source-separated organics (SSO) or industrial, commercial or institutional waste (ICI). This feed material is pre-processed, for example in a comminuting device or press, to reduce the size of organic material and optionally to remove contaminants. Yet the organic fraction still contains at least some contaminants. The device and process described herein provide a further separation of contaminants, in particular floatables, from the pre-processed organic fraction. The device may also be called a separator or polisher. The polished organic waste may be treated further, for example by anaerobic digestion or composting.

The organic waste is decontaminated in a device having a cylindrical screen and a set of discrete paddles or blades rotating within the screen. Organic waste is fed into a first end of the screen, but the screen is not filled with the organic waste. The paddles break up the organic waste into globs, and throw the globs against the screen. The paddles may also disperse the wet fraction at least partially along the length of the screen. Most of the organic waste is thrown out through the perforations of the screen. At the same time, air is drawn in through the perforations of the screen and out through a second end of the screen by a blower. Water and particles of organic material tend to be thrown out through the perforations while contaminants, in particular floatables, tend to be entrained in the airflow and carried to a discharge chute at the second end of the screen. Optionally, the organic waste may be diluted, for example with digestate or water produced while dewatering digestate, before it is fed into the device.

The device may have one or more optional features. The cylindrical screen may be oriented horizontally. The shaft of a rotor containing the paddles may be supported on bearings located outside of the screen. There may be gaps between these bearings and the end of the screen. Additional blades or discs or both may be added inside the ends of the screen. The discharge chute may expand as it extends form the cylindrical screen. There may be an auger to help remove the separated contaminants from the discharge chute. As described in more detail further below, some of these features can help the polisher convey organic waste or contaminants. Other features help make the polisher more durable, for example by keeping organic waste away from the bearings.

By removing contaminants, in particular floatables, the device makes the organic fraction more suitable for biological treatment. Removing contaminants before biological treatment also tends to improve the quality of the biologically treated products. The device and process described herein have been used to remove over 90% of the floatables from pressed organic waste. Co-digestion with WWTP sludge further dilutes the concentration of floatables fed into a digester.

One standard for digestate land application require physical contaminants larger than 4 mm to be no more than 0.1% of the digestate on a wet basis. In at least some cases, pressed organic waste treated to remove floatables as described herein and co-digested in a wet anaerobic digester with WWTP sludge can produce digestate that meets this standard without additional steps to remove floatables.

DETAILED DESCRIPTION

Figure 1:
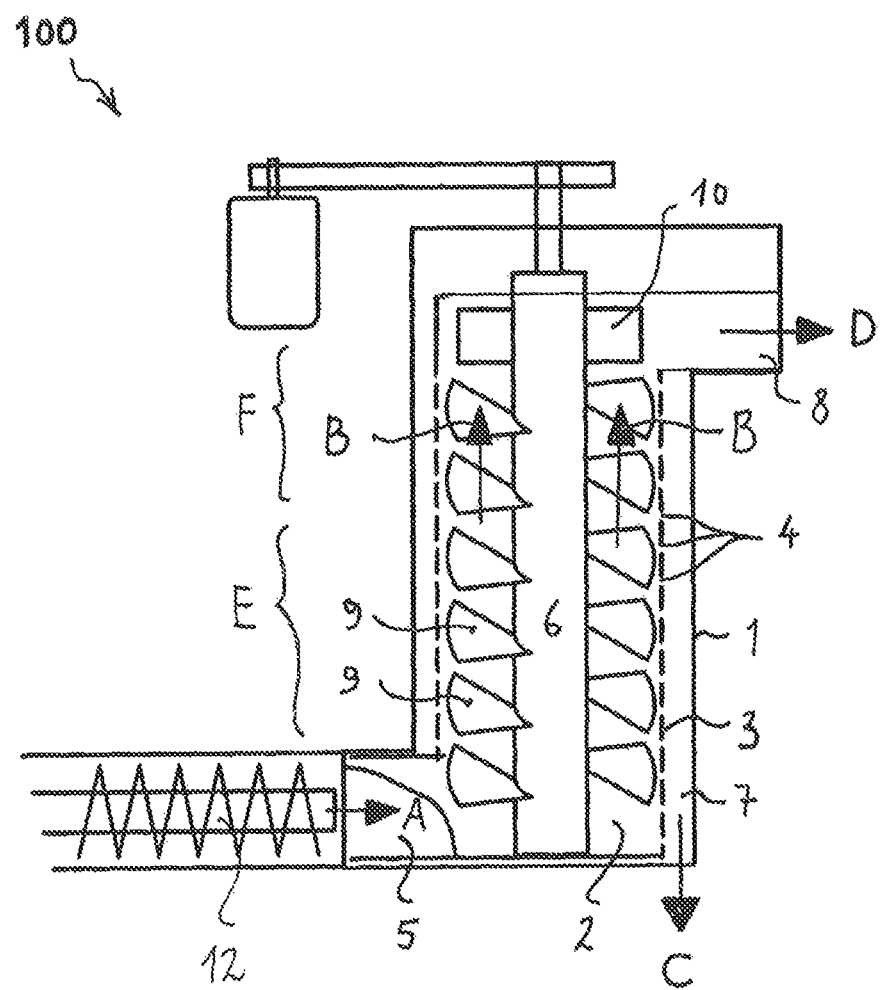
FIG. 1 shows a cross-section in elevation view of a first separator.

Solid waste containing digestible organic material may be, for example, municipal solid waste (MSW), source-separated organics (SSO), industrial, commercial and or institutional waste (ICI), or a mixture of one or more of these of other wastes. The waste is typically pre-processed to some extent. For example, the waste may pass through a bag opener, to release the waste from solid plastic or mesh bags, and through a double screw conveyor to roughly homogenize the waste. Large pieces of waste and metals may be removed.

The waste may then further processed, optionally in a press. The press compresses the waste at high pressure through small perforations. For example, the pressure may be at least 50 bar. The perforations may be, for example, 4 to 8 mm diameter circular holes. The press separates the waste into a wet fraction that passes through the perforations, also called pressed organic waste, and a dry fraction, alternatively called a solid fraction, that is retained by the perforations. The pressed organic waste contains soluble and suspended organic compounds, including organics contained in cells ruptured under the high pressure.

A suitable press is described in International Publication Number WO 2015/053617, Device and Method for Pressing Organic Material Out of Waste, which is incorporated herein by reference. A similar commercially available press is the Orex™ press sold by DB Technologies B.V. Other presses, for example as described in European Publication Nos. 1207040 and 1568478 and Italian patent publication ITT020111068, may also be used. Another suitable commercially available press is the VM 2000™ press sold by VMPress s.r.l. These presses operate at high pressures, for example 180 to 220 bar, and are particularly well suited for use with MSW. Presses that operate at lower pressures in a range of about 50 to 150 bar include the Biorex™ press sold by DB Technologies B.V. These presses may be preferred for SSO and ICI waste having high water content.

The pressed organic waste contains contaminants, including floatables. The floatables are not necessarily more dense than water. For example, PVC film sinks in still water but is easily entrained in rising digestate and is still considered a floatable. The size of the contaminants can cover a broad range. For example, if the wet fraction was produced in a press with 4-8 mm round holes, a piece of thin plastic film or foil, for example a piece of a shredded plastic bag, can be pushed through the hole if it is smaller than the hole, but also if it is tens of millimeters wide. The floatables are typically made up primarily of plastic, but there may also be, for example, pieces of paper or textiles.

The pressed organic waste is typically a viscous paste or slurry with a 20-35 wt % solids content, for example 20-25% when pressing wet commercial waste and 30-35% when pressing residential MSW. The pressed organic waste also typically has a 85-95% volatile solids to total solids ratio. The non-volatile solids include floatables and grit.

Conventional devices that process solid waste, such as a hammer mill or shear cutter, may also be used in place of press. These devices generally break up (i.e. shred, crush or comminute) the waste into small pieces. These devices therefore reduce the waste to a homogenous and smaller size. In some cases, the device also provides some contaminant removal. In other cases, some contaminants are removed in a downstream device, such as a trommel screen or screw press. While these devices can be used, the press is preferred. The press provides a better separation between wet and dry fractions. The press leaves less contaminants, in particular less floatables, for example, in the processed organic waste.

The organic waste, pre-treated by a press or other device, is treated again before it is sent to the digester. The organic waste still contains contaminants, such as pieces of plastic films, foils or bags. In pressed organic waste, floatable contaminants may be 2 wt % or less on a wet basis, for example 1 to 1.5 wt % (wet basis). If the contaminants are not removed, mixing in a wet digester can cause some of the contaminants to collect at the top of the digester and interfere with its operation or to be discharged with the digestate and reduce its quality.

The organic is treated to remove contaminants in a device, which may be called a separator or polisher. In the separator, the organic waste is fed into the first end of a generally cylindrical screen. The cylindrical screen has solid ends but has a perforated area on its lateral side.

The cylindrical screen surrounds a rotor. The rotor has discrete paddles, also called blades, attached to a central shaft of the rotor. The paddles extend outwards from the central shaft to an outside diameter of, for example, 0.5 to 1.2 m at the tips of the paddles. The paddles do not form a helix or screw. For example, each paddle may extend across an arc of less than 150 degrees, for further example between 70 and 150 degrees. However, the paddles are preferably arranged such that, as the rotate, they collectively sweep across essentially all of the perforated area of the cylindrical screen. The paddles are set at an oblique angle, neither parallel nor perpendicular to the central shaft of the rotor, with the leading edge of each paddle (considering the direction of rotation) closer to the first end of the screen.

The rotor spins at more than 500 rpm, for example 600-800 rpm or up to 1000 rpm. The diameter of the rotor, and its speed or rotation, generate a centrifugal force of 50 g or more, optionally 150 g (1500 m/s$^2$) or more, at the tips of the paddles. The screen is not filled with organic waste, but rather the paddles pick up globs of organic waste as it enters through a feed opening at the first end of the screen. The paddles fling the globs outwards against perforated lateral walls of the cylindrical screen. The oblique angle of the paddles also defects or accelerates the organic waste towards a second end of the cylinder. A blob of organic waste flung from one paddle may be intercepted by one or more other paddles as it travels, thus breaking up the glob into smaller units and dispersing the organic waste at least part way across the length of the cylinder. The rotor does not press the organic waste through the screen. Instead, a pulse applied by the rotor gives the organic waste momentum in a direction perpendicular or at least oblique to the lateral walls of the screen. The momentum of the organic waste applied against the fixed screen forces the organic waste through the perforations.

Water and particles of organic material are discharged through the perforations in the screen. Some organic material does not pass through the perforations and collects on the inside of the screen. In the case of a vertically oriented cylinder, organic waste that collects on the inside of the screen falls back down to the first end of the screen and is picked up again by the paddles. With a vertically oriented cylinder, organic waste that collects inside the upper part of the screen may all back onto the rotor and be re-suspended by the paddles. Another part of the organic waste collects at the bottom of the screen. Preferably, the paddles pass close to the inside of the screen, for example within 5 or 10 mm of the inside of the screen. The paddles pick up and re-suspend organic waste that collects on the inside of the screen. Optionally, specialized scraping paddles may be added but they are not needed if the primary paddles pass within the tolerance described above.

While the paddles are breaking up and flinging globs of the organic waste, a blower draws air in through the perforations and towards the second end of the screen. The air flowing across or against the organic waste separates floatable contaminants from the rest of the organic waste. The blower may be integrated with the rotor, for example by adding blower shaped blades running inside a non-perforated part of the cylindrical screen at the second end of the screen. Alternatively, a separate blower may be used. The paddles may also contribute to creating airflow. The airflow is significant, for example 1500 m$^3$/hr or more per square meter of cross sectional area of the screen, or 180 m$^3$/hr or more per square meter of perforated area of the cylindrical screen, measured at the second end of the screen. The residence time of air, calculated by dividing the volume of the cylinder by the air flow rate, is preferably less than 1.0 seconds.

After passing through the screen, treated organic waste may be collected in a housing around the screen. The collected waste is removed through a first discharge opening in communication with the housing. Optionally, water can be sprayed at the screen, from inside the cylinder or outside the cylinder or both, to help keep the screen clean. Any screen washing water preferably dilutes the treated organic waste by 2% or less. The treated organic waste is suitable for biological treatment, for example anaerobic digestion or composting. Optionally, the treated organic material may be further processed to remove grit before biological treatment.

Contaminants are removed in a second discharge opening in communication with the second end of the screen. In the case of an integral blower, the second discharge opening is also the outlet of the blower. Blades of the blower can also physically push contaminants into the second discharge opening. Optionally, an additional scraper blade can be added at the second end of the cylinder to help physically push contaminants into the second discharge opening. This can help clear or avoid blockages at the inlet to the second discharge opening that could otherwise interfere with exhausting air from the screen. The second discharge opening preferably widens as it extends away from the cylindrical screen. This helps prevent blockages from forming downstream of the inlet.

An optional screw conveyor communicates with the second discharge opening and physically conveys contaminants out of, or away from, the second discharge opening. The screw of the screw conveyor is preferably shaft-less and runs in a conduit having a semi-cylindrical trough connected to a larger plenum that provides a passage for air to flow over the screw. The conduit may also have an expansion chamber. As the air velocity decreases in the expansion chamber, contaminants fall into the screw and are physically carried away. Low velocity air leaving the expansion chamber can be sent to an odor removal unit.

The separated contaminants are primarily floatables, such as bits of plastic film. The separated contaminants are typically dry and clean enough to be used as refuse derived fuel (RDF) or mixed back in with a dry fraction removed while processing the organic waste upstream of the separator. Alternatively, the separated contaminants may be landfilled.

In some cases, the organic waste is diluted before it is fed to the separator. The organic waste may be diluted with digestate, or filtrate from dewatering digestate. The digestate may come from an anaerobic digester that will receive the polished organic waste to avoid consuming fresh water or diluting the digester itself. The degree of dilution can be selected to remove a desired amount of plastic film. Preferably, at least 90% of floatables, in particular plastic film pieces, are removed in the separator when starting with organic waste having a floatables concentration of 2 wt % (wet basis) or less. The separator can treat pressed organic waste at its full concentration, which is typically about 20 to 35 wt % solids. However, organic waste with solids at the high end of this range, for example 30 to 35 wt %, may require some dilution to reach the target treatment efficiency, to produce sufficiently clean separated contaminants, or to inhibit solids build up in parts of the screen. When treating comminuted organic waste, good results are typically achieve when the organic waste is sent to the separator at less than 20 wt % solids, for example 12 to 15 wt %. The loading rate may be in the range of, for example, 5,000-15,000 kg of dried solids per hour per cubic meter of cylinder volume. However, the maximum loading rate for the floatable fraction, which in one example is about 4,000 kg per hour per cubic meter of cylinder volume, should also not be exceeded.

Organic waste can be fed to the separator by an auger, preferably a shaft less auger, from a buffer tank. Dilution, if required, can be achieved by mixing dilution water into the buffer tank before conveying the diluted organic waste to the separator.

A horizontal screen is preferred, in part because it is more tolerant to overloading. If a vertical screen is overloaded, either organic waste or separated contaminants can begin to fill the first end of the cylinder. The separator can be damaged. If a horizontal separator is overloaded, the paddles will push the organic waste and separated contaminants towards the second end of the cylinder. The blades of the blower, or scraper blades if any, while push the material out of the second discharge opening. While this may cause some of the separated contaminants to be unclean, the separated contaminants can be washed and the separator can continue to operate without damage.

A vertical configuration also requires a bearing for the rotor somewhere near the first end of the screen. The organic waste is viscous and typically contains at least some grit. Accordingly, the bearings can be destroyed if organic waste enters them. The bearings can be located outside of the screen, but even then any leakage around the rotor shaft pass through opening will result in organic waste trickling down into the bearings. With a horizontal configuration, the rotor shaft can be supported on bearings located outside of the screen but gravity does not push organic waste directly into any gaps where the rotor shaft passes through the ends of the screen. An optional scraper blade can sweep at least the first end of the cylinder to help prevent organic waste form accumulating near the rotor shaft pass though opening. With a horizontal screen, any organic waste escaping from the screen tends to trickle down the end of the cylinder rather than into the bearings.

FIG. 1 shows a first separator 100. The separator 100 has a housing 1 having therein a cylindrical chamber 2. The wall 3 of the cylindrical chamber 2 has perforations 4, for example circular holes of about 5-12 mm, optionally about 5-8 mm, in diameter. Optionally, perforations 4 may be other shapes such as hexagonal. A feed opening 5 admits the organic waste A conveyed by auger 12. There is also a first discharge opening 7 for discharging polished organic waste C and a second discharge opening 8 for discharging separated contaminants D, alternatively called rejects. A rotor 6 rotates, preferably, at a speed of 500 rpm or more. The speed and diameter of the rotor are sufficient to create over 50 G, for example 150 to 170 G, of centrifugal force in the tips of first blades 9 of the rotor 6. The first blades 9, also called paddles, are oriented obliquely to the rotation axis of the rotor. In particular, the first blades 8 are pitched to deflect organic waste upwards. The first blades 9 are preferably discrete blades and do not form a helix. The rotor 6 also has second blades 10, which are generally parallel to the axis of the rotor 6 and located near the second discharge opening 8. Second discharge opening 8 is oriented tangentially to the outer circumference of second blades 10. Second discharge opening 8 is part of a non-perforated part of the cylindrical chamber 2 surrounding second blades 10. Second blades 10 thereby operate like blades in a centrifugal air blower.

In use, organic waste A is introduced into chamber 2 by auger 12 through feed opening 5. Inside of chamber 2, first blades 9 fling globs of the organic waste A upwards and outwards against the wall 3. The blades 9, 10 or rotor 6 generate an airflow B through and out of chamber 2, for example at a speed of 15 m/s and 4000 $m^3$/h. Particles of organic matter and water are flung out through perforations 4 and collect at first discharge opening 7. The particles may deform as they pass through the perforations 4. Contaminants such as pieces of plastic film or foil are carried by airflow B and blown out of cylinder 2. Organic particles are mainly flung out through perforations 4 in a first part E of the chamber 2. Airflow B is mainly drawn in through perforations 4 in a second part F of the chamber 2. However, some air is also drawn in through perforations 4 in first part E due to the very large airflow and the lack of air inlets other than the perforations 4. Optionally, the wall 3 may be sprayed with water intermittently for cleaning.

A second separator 200 shown in FIG. 2 again comprises a housing 1 having therein a cylindrical chamber 2, the wall 3 of which is again provided with perforations 4, and a rotor 6. The orientation of rotor 6 is now however not vertical but horizontal. This is possible because the influence of gravitational force is negligible in relation to the relatively high centrifugal accelerations and air velocities.

Second separator 200 also comprises a number of optional third blades 11 forming part of rotor 6 for the purpose of removing material present on the inner side 13 of wall 3 of chamber 2. The outer ends of third blades 11 are situated for this purpose in the vicinity of this inner side 13, for example within 10 mm. Material possibly accumulating on this inner side 13, in particular between first blades 9, can thus be removed from this inner side 13. Second separator 200 also comprises a discharge chute 14 and an auger 15 to help remove the separated contaminants from the discharge chute 14. The discharge chute 14 provides an air passage 17 for air to flow over the auger 15, and an expansion chamber 16.

Figure 2:
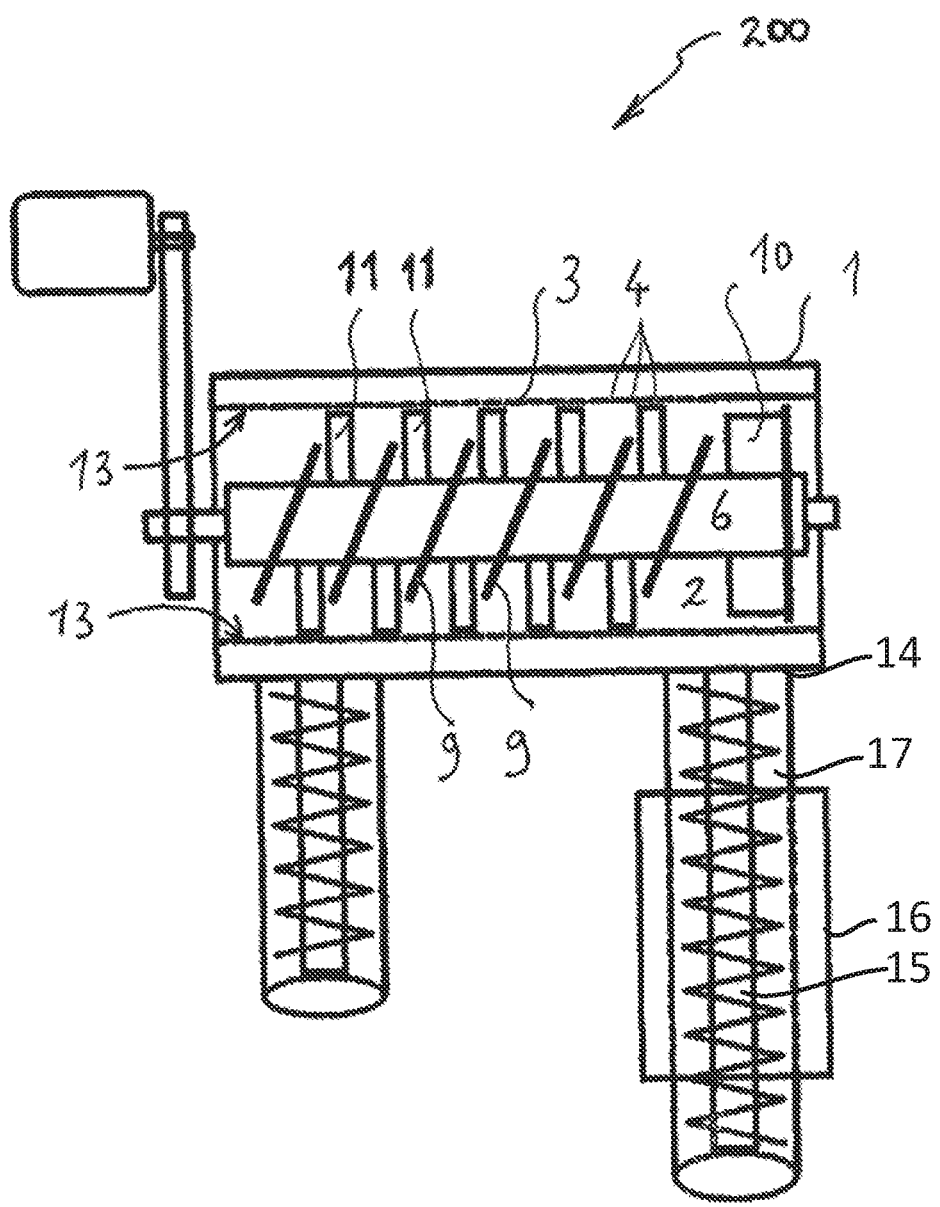
FIG. 2 shows a cross-section in elevation view of a second separator.

Further details of the separators of FIGS. 1 and 2 are contained in International Publication Number WO 2015/050433, which is incorporated herein by reference.

Figure 3:
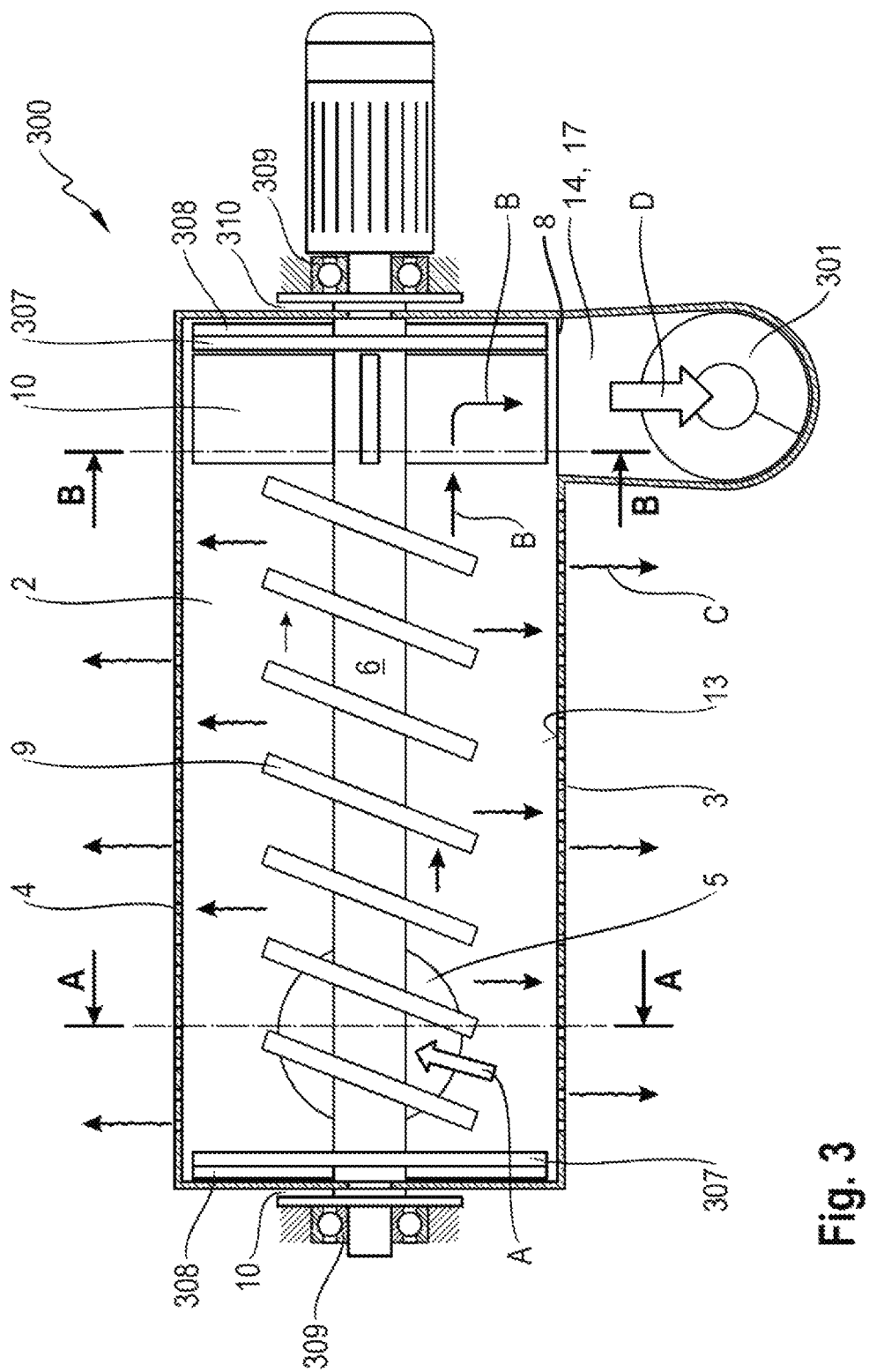
FIG. 3 shows a cross section in elevation of a third separator.
Figure 5:
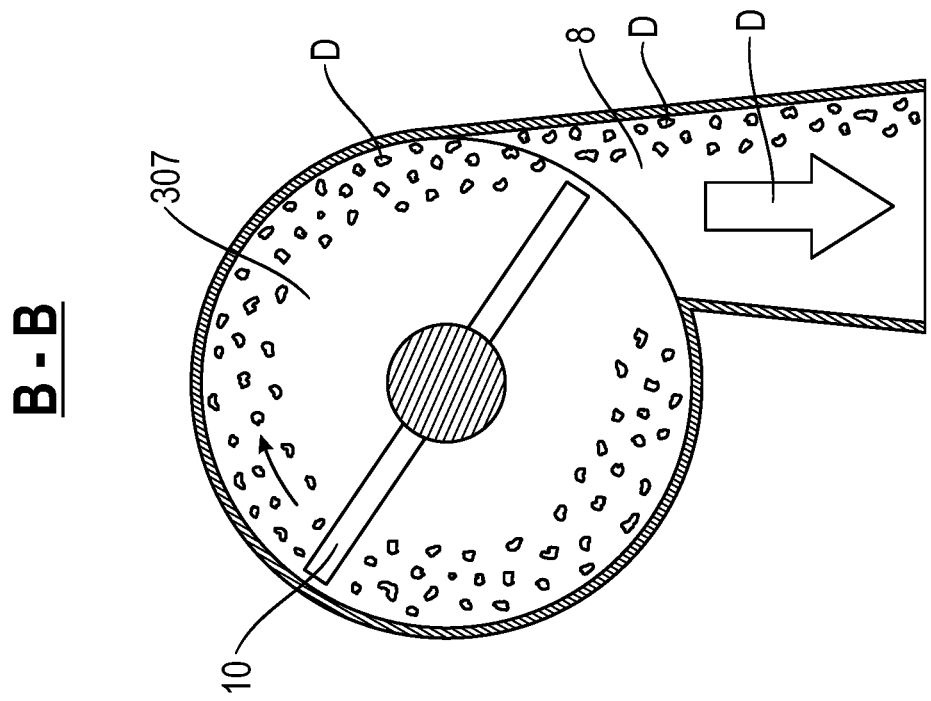
FIG. 5 is a cross section of the device in FIG. 3 along cut lien B-B in FIG. 3.

FIG. 3 shows a third separator 300. The third separator 300 is similar is some respects to the separators described above and the same reference numerals are used to indicate similar components. Some features of the third separator 300 will be described below.

Figure 4:
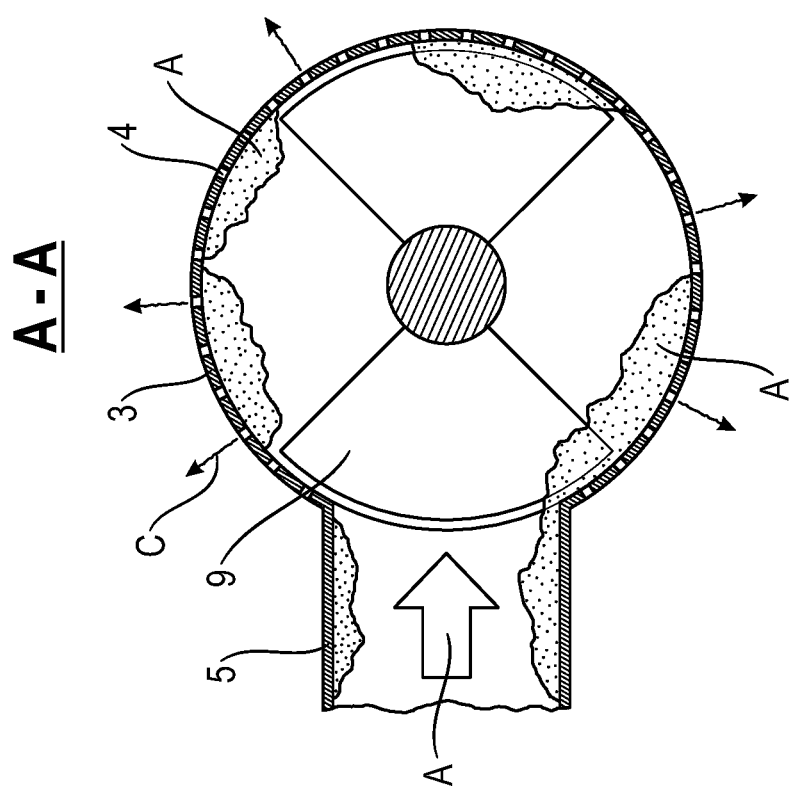
FIG. 4 is a cross section of the device in FIG. 3 along cut line A-A in FIG. 3.

A housing 1 as described above is present but not shown to simplify the drawing. Cylindrical chamber 2 is oriented horizontally. The first blades 9 are discrete blades and do not form a helix. The third separator 300 shown has fourteen first blades 9, seven are visible in the figure and another seven on the opposite side of the rotor 6 are not shown. Referring to FIG. 4, each first blade 9 extends across about 20 to 40% of the circumference or area of the rotor.

The cylindrical chamber 2 is not intended to completely fill with material anywhere along its length while the third separator 300 is in normal operation. As shown in FIG. 4, blobs of incoming organic waste A are sliced away from the feed opening 5 by the first blades 9. Although the first blades 9 do not form a helix, they are mounted at an angle to the rotor 6 such that any material they impact is pushed outwards and towards the second discharge opening 8. The tips of the first blades 9 are shown displaced from inner side 13 of wall 3 to simplify the figure. However, the tips of the first blades 9 are preferably only 10 mm or less, or 5 mm or less, away from the inner side 13 of wall 3. The first blades 9 can scrape excess organic waste A from inner side 13 and convey both organic waste A and separated contaminants D towards the second discharge opening 8. Third blades 11 as described above are not required.

The horizontal configuration allows the rotor 6 to be supported on two sets of bearings 309. The bearings 309 are not required to support the weight of the rotor as an axial load. The bearings 309 are placed outside of the cylindrical chamber 2 and are not exposed to the organic waste A. Gaps 310 are provided between the ends of the cylindrical chamber 2 and the bearings 309. If organic waste A leaks out of the cylindrical chamber 2 where the rotor 6 passes through the end of the cylindrical chamber 2, gravity, or gravity and centrifugal force, will pull the wet fraction through the gap 310 rather than into a bearing 309.

Separated contaminants D pass through discharge opening 8 into discharge chute 14 to an extraction screw conveyor 301. Extraction screw 301 is preferably shaft-less. Airflow B is not required to convey separated contaminants D clear of the separator 300, but only into extraction screw 301. Extraction screw 301 extends away from chamber 2, for example perpendicular to rotor 6. Extraction screw 301 turns inside of a semi-cylindrical housing that supports its lower half, and an upper housing that provides a channel for airflow above the extraction screw 301. Airflow B travels through this channel to leave the third separator 300. One part of the channel connects to an expansion box (not shown) with baffles where the airflow B slows down and releases any remaining entrained contaminants D. The released contaminants fall to the extraction screw 301 and are removed.

There are no perforations 4 in the chamber 2 around second blades 10 to enhance their ability to create airflow B. This area of the chamber 2 operates like a centrifugal blower with the second discharge opening 8 at the outlet of the blower. The discharge opening 8 is aligned tangentially with chamber 2 and preferably points downwards. The second discharge opening 8 has a cross section that diverges away from chamber 2 to help prevent clogging by contaminants D. There are no air inlets other than perforations 4 in the wall 3 around first blades 9. This causes air to be drawn in through perforations 4, even at least some of the same perforations 4 that at times emit polished organic material C.

End plates 307 help prevent wet fraction A or contaminants D from contacting the ends of the chamber 2. This avoids having moving material drag against the fixed walls of the chamber 2. Scraper blades 308 attached to the end plates 307 prevent a build up of organic waste A or separated contaminants D between end plates 307 and the ends of chamber 2 by physically removing material in this area. This reduces friction or binding between the end plates 307 and the chamber 2 and also helps prevent organic waste A from reaching the bearings 309. The scraper blades 308 and second blades 10 are upstream of second discharge opening 8 relative to airflow B and can push separated contaminants D out of the chamber 2 even if air is blocked from flowing out of the second discharge opening 8.

The removal of particles of plastic film less than the size of the openings in the cylindrical screen suggest that separation occurs at least partially by a mechanism other than sieving. The inventor has observed that more contaminants are removed when the openings are 5 mm rather than 8 mm. However, the increased removal could be caused by higher speed or more focused airflow through the smaller holes.

When the organic waste is produced in a press, pieces of plastic film can be pushed through the perforations of a press whether these pieces are wider or narrower than the perforations of the press. This suggests that the ideal size of perforations in the separators is not necessarily related to the size of the perforations in the press. However, the separators tested so far have had perforations within 3 mm in diameter of the perforations in the press, sometimes larger and sometimes smaller, and have performed well.

The separation devices as described above have produced in some cases polished organic waste that, when co-digested with WWTP sludge in a wet anaerobic digester, creates digestate having 0.1% or less (dry basis) of contaminants greater than 2 mm in size. This well exceeds standards for land application or composting of the digestate.

I claim:

1. A device for separating floatable contaminants from organic waste comprising,
   a horizontal cylindrical chamber;
   a rotor, the rotor having,
      a plurality of discrete blades distributed along the length of the rotor within a cylindrical porous portion of the chamber such that the discrete blades rotate relative to the porous portion of the chamber;
      one or more blades within a non-porous portion of the chamber, the one or more blades, with or without the rotor and/or discrete blades, forming a blower for generating airflow from the porous portion to the non-porous portion to carry separated floatable contaminants toward the non-porous portion of the chamber, wherein the non-porous portion of the chamber has a discharge opening, wherein the airflow makes up the totality of airflows in the chamber;
   an auger in communication with the discharge opening to carry the separated floatable contaminants away from the discharge opening.

2. The device of claim 1 further comprising a diverging discharge chute in communication with the discharge opening and the auger, the diverging discharge chute expanding away from the discharge opening.

3. The device of claim 2 wherein the chute is configured to provide an air passage for the airflow to flow over the auger, and includes an expansion chamber configured to cause a decrease in the velocity of the air flow over the auger in the expansion chamber.

4. The device of claim 1 wherein the rotor is supported on bearings located outside of the chamber.

5. The device of claim 1 wherein the rotor has a plate at one or both ends of the chamber.

6. The device of claim 5 having a scraping blade between the plate and the end of the chamber.

7. The device of claim 1 wherein each of the blades located within the porous portion of the chamber spans across 20 to 40 degrees of the circumference of the rotor.

8. The device of claim 1 wherein each of the blades located within the porous portion of the chamber extends across an arc of between 70 and 150 degrees of the circumference of the porous portion.

9. The device of claim 1 wherein the discrete blades lie obliquely to the rotation axis of the rotor.

* * * * *